United States Patent
Muraki

(10) Patent No.: US 9,570,033 B2
(45) Date of Patent: Feb. 14, 2017

(54) DRIVER, ELECTRO-OPTICAL DEVICE, AND ELECTRONIC DEVICE

(71) Applicant: SEIKO EPSON CORPORATION, Tokyo (JP)

(72) Inventor: Norichika Muraki, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 41 days.

(21) Appl. No.: 14/669,943

(22) Filed: Mar. 26, 2015

(65) Prior Publication Data

US 2015/0279303 A1    Oct. 1, 2015

(30) Foreign Application Priority Data

Mar. 27, 2014   (JP) ................................ 2014-065427

(51) Int. Cl.
   *G09G 3/36*     (2006.01)
   *G06F 3/147*    (2006.01)

(52) U.S. Cl.
   CPC ............ *G09G 3/3696* (2013.01); *G06F 3/147* (2013.01); *G09G 3/3622* (2013.01); *G09G 2310/0278* (2013.01); *G09G 2310/08* (2013.01); *G09G 2320/0257* (2013.01); *G09G 2330/027* (2013.01)

(58) Field of Classification Search
   CPC ............ G06F 3/147; G09G 2310/0278; G09G 2310/08
   See application file for complete search history.

(56) References Cited

U.S. PATENT DOCUMENTS

| | | | | |
|---|---|---|---|---|
| 2002/0080133 A1* | 6/2002 | Eu | ................ | G09G 3/3648 345/212 |
| 2008/0143702 A1* | 6/2008 | Park | ................ | G09G 3/3648 345/211 |
| 2009/0009503 A1* | 1/2009 | Tajiri | ................ | G09G 3/3655 345/211 |
| 2011/0102405 A1* | 5/2011 | Harada | ................ | G09G 3/3655 345/211 |
| 2011/0157138 A1* | 6/2011 | Origuchi | ................ | G09G 3/293 345/211 |
| 2013/0069925 A1* | 3/2013 | Lin | ................ | G09G 5/00 345/211 |

FOREIGN PATENT DOCUMENTS

| | | |
|---|---|---|
| JP | 2005-094574 A | 4/2005 |
| JP | 2009-014987 A | 1/2009 |

* cited by examiner

*Primary Examiner* — Andrew Sasinowski
*Assistant Examiner* — Chun-Nan Lin
(74) *Attorney, Agent, or Firm* — Oliff PLC

(57) ABSTRACT

A driver, an electro-optical device, and an electronic device are provided with which a rise in a ground line voltage due to a discharge can be suppressed. The driver includes a voltage generating circuit 100 that generates a first voltage VA1 and a second voltage VA2 for driving a display panel, outputs the first voltage VA1 to a first node NA1, and outputs the second voltage VA2 to a second node NA2, and a discharge circuit 140 that performs a discharge operation if the voltage generating circuit 100 is deactivated. The discharge circuit 140 performs a first discharge operation of discharging the first node NA1, and thereafter performs a second discharge operation of discharging the second node NA2.

19 Claims, 9 Drawing Sheets

DRIVER, ELECTRO-OPTICAL DEVICE, AND ELECTRONIC DEVICE

CROSS REFERENCE

The entire disclosure of Japanese Patent Application No. 2014-065427, filed Mar. 27, 2014, is expressly incorporated by reference herein.

BACKGROUND

1. Technical Field

The present invention relates to a driver, an electro-optical device, an electronic device, and the like.

2. Related Art

In a passive matrix liquid crystal display (LCD) (or segment LCD), a phenomenon called "momentary lighting" occurs, i.e., undesired light is displayed when the power is turned off. Voltage for driving a liquid crystal display panel is in general held by a stabilizing capacitor. The momentary lighting is caused by the driving voltage held by this stabilizing capacitor being applied to the liquid crystal display panel when the system power is turned off.

In order to avoid the aforementioned momentary lighting, a method is available in which the charge of a stabilizing capacitor is discharged when the power is turned off (e.g., JP-A-2005-094574). When the driving voltage is generated within a driver, a discharge current thereof flows to a ground line within the driver. At this time, a problem arises in that ground line voltage rises due to parasitic resistance of the ground line.

For example, when power for a low voltage circuit (e.g., logic circuit) is generated within the driver, the power is generated with the ground line voltage within the driver as a reference. For this reason, if the ground line voltage rises, the power supply voltage also rises and may possibly exceed breakdown voltage of the low voltage circuit.

SUMMARY

According to some aspects of the invention, a driver, an electro-optical device, an electronic device, and the like can be provided with which a rise in ground line voltage due to a discharge can suppressed.

An aspect of the invention relates to a driver including: a voltage generating circuit that generates a first voltage and a second voltage for driving a display panel, outputs the first voltage to a first node, and outputs the second voltage to a second node; and a discharge circuit that performs a discharge operation if the voltage generating circuit is deactivated. The discharge circuit performs a first discharge operation of discharging the first node, and thereafter performs a second discharge operation of discharging the second node.

According to an aspect of the invention, when the voltage generating circuit is deactivated, the first node to which the first voltage is output is discharged, and thereafter the second node to which the second voltage is output is discharged. Since timings at which the first node and the second node are discharged are different, a rise in ground line voltage due to the discharge can be suppressed.

In an aspect of the invention, the voltage generating circuit may have a first voltage drop circuit that drops the second voltage to generate the first voltage.

If the second node is first discharged, the voltage of the second node lowers earlier than the voltage of the first node. Then, a current flows from the first node having a higher voltage to the second node having a lower voltage via the first voltage drop circuit, and the first node is simultaneously discharged as well. In this regard, according to an aspect of the invention, the first node is first discharged. Therefore, a state can be maintained in which the voltage of the second node is higher than the voltage of the first node. With this configuration, the second node is not discharged when the first node is first discharged, and the discharge timings can be distributed.

In an aspect of the invention, the voltage generating circuit may have a booster circuit that boosts a system power supply voltage to generate the second voltage, and the first voltage drop circuit may generate a common voltage of the display panel as the first voltage obtained by dropping the second voltage.

The common voltage is supplied to the passive matrix type display panel using super-twisted nematic (STN) liquid crystals or the like, for example. In this kind of display panel, the resistance value of the ground line is large as described later, and the ground line voltage is likely to become high due to a discharge current. In this regard, according to an aspect of the invention, the discharge timings can be distributed. Therefore, a rise in the ground line voltage can be reduced even when the resistance value of the ground line of the display panel is large.

In an aspect of the invention, the voltage generating circuit may have a second voltage drop circuit that drops the first voltage to generate a third voltage, and outputs the third voltage to a third node, and the discharge circuit may perform a third discharge operation of discharging the third node, and thereafter perform the first discharge operation.

Since the third node is first discharged, a state can be maintained in which the voltage of the first node is higher than the voltage of the third node. With this configuration, the first node is not discharged when the third node is first discharged, and the discharge timings can be distributed.

In an aspect of the invention, the second voltage drop circuit may generate a segment voltage of the display panel as the third voltage.

The segment voltage is supplied to the passive matrix type display panel using STN liquid crystals or the like, for example. According to an aspect of the invention, the discharge timings can be distributed. Therefore, a rise in the ground line voltage can be reduced even when the resistance value of the ground line of the display panel is large.

In an aspect of the invention, a control circuit that controls the discharge circuit may further be included. The discharge circuit may have first to third switching circuits that are provided between a node of a ground line voltage and the first to third nodes, respectively, and, by the control circuit turning on the third switching circuit, the first switching circuit, and the second switching circuit in this order, the discharge circuit may perform the third discharge operation, the first discharge operation, and the second discharge operation in this order.

The current discharged from the first to third nodes flows into the node of the ground line voltage via the first to third switching circuits. According to an aspect of the invention, the first to third switching circuits are turned on at different timings. Dispersing of the timing at which the discharge current flows can thereby be achieved.

In an aspect of the invention, first to third output terminals for connecting first to third external capacitors may further be included. The first to third nodes may be connected to the first to third output terminals.

When the first to third nodes are discharged, the charges held by the first to third external capacitors are discharged, and a large discharge current occurs. According to an aspect of the invention, the discharge timings are distributed. Therefore, a rise in the ground line voltage can be reduced even when a large discharge current flows from the external capacitors.

In an aspect of the invention, a drive circuit that drives the display panel based on at least the first voltage among the first voltage and the second voltage may further be included. After the drive circuit ends the driving of the display panel, the voltage generating circuit may be deactivated, and the discharge circuit may perform the discharge operation.

The discharge operation is an operation performed before the system power is turned off, in order to avoid momentary lighting of the display panel. According to an aspect of the invention, after a drive circuit ends driving of the display panel, the discharge operation can be performed before the system power is turned off, and momentary lighting can be avoided.

Another aspect of the invention relates to an electro-optical device including: any one of the above-described drivers; and the display panel.

In another aspect of the invention, a ground terminal of the electro-optical device and a ground terminal of the driver may be connected to each other by an interconnect of a transparent electrode of the display panel.

Since the resistance value of an interconnect of the transparent electrode is large, the ground line voltage within the driver rises when a discharge current flows. In this regard, the driver in the invention can distribute the discharge current, and accordingly a rise in the ground line voltage can be reduced.

Still another aspect of the invention relates to an electronic device including any one of the above-described drivers.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferable embodiment of the invention will be described in detail. Note that the present embodiment described below is not intended to unduly limit the content of the invention described in the scope of claims, and not all configurations described in the present embodiment are necessarily essential as solving means of the invention.

1. Driver

Figure 1:
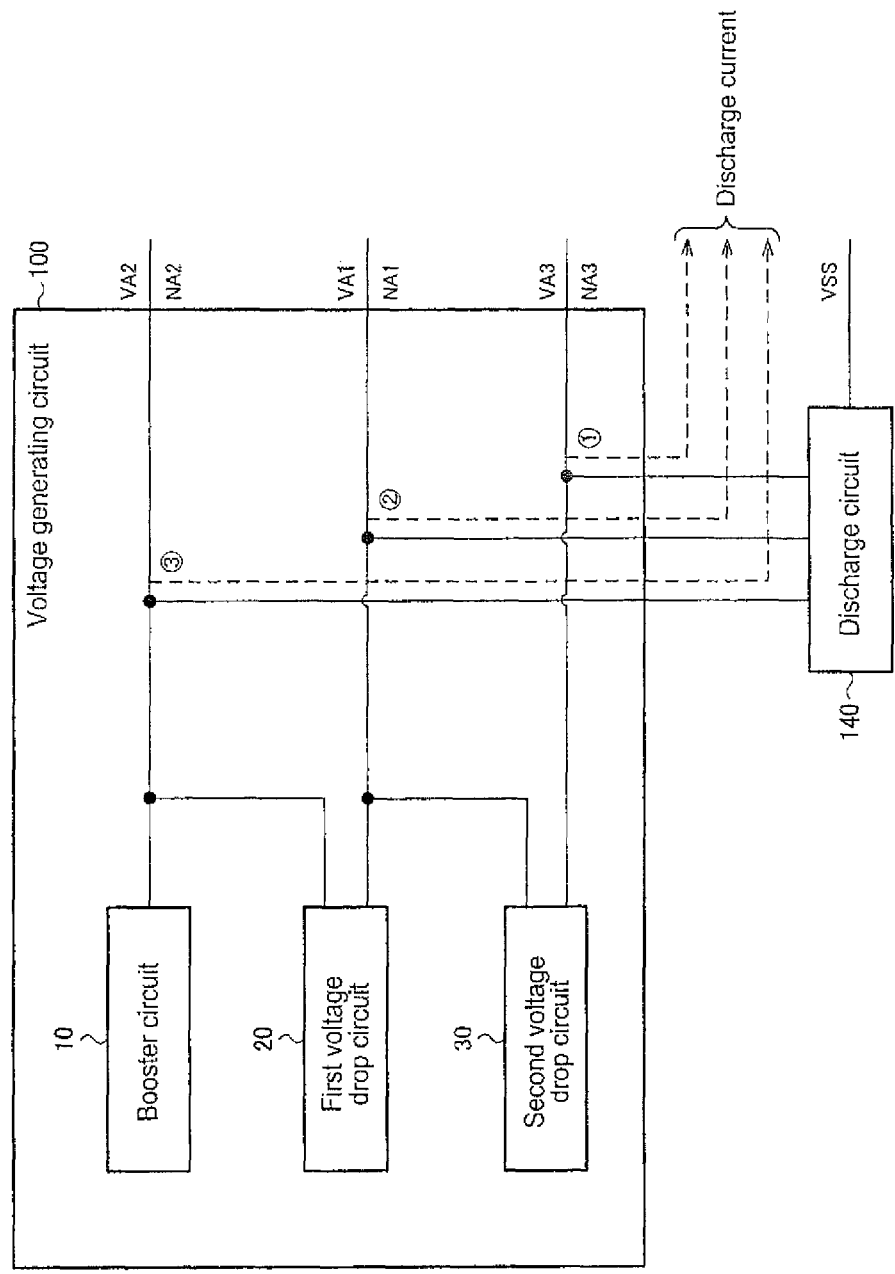
FIG. 1 shows an exemplary configuration of a driver in the present embodiment.
Figure 3:
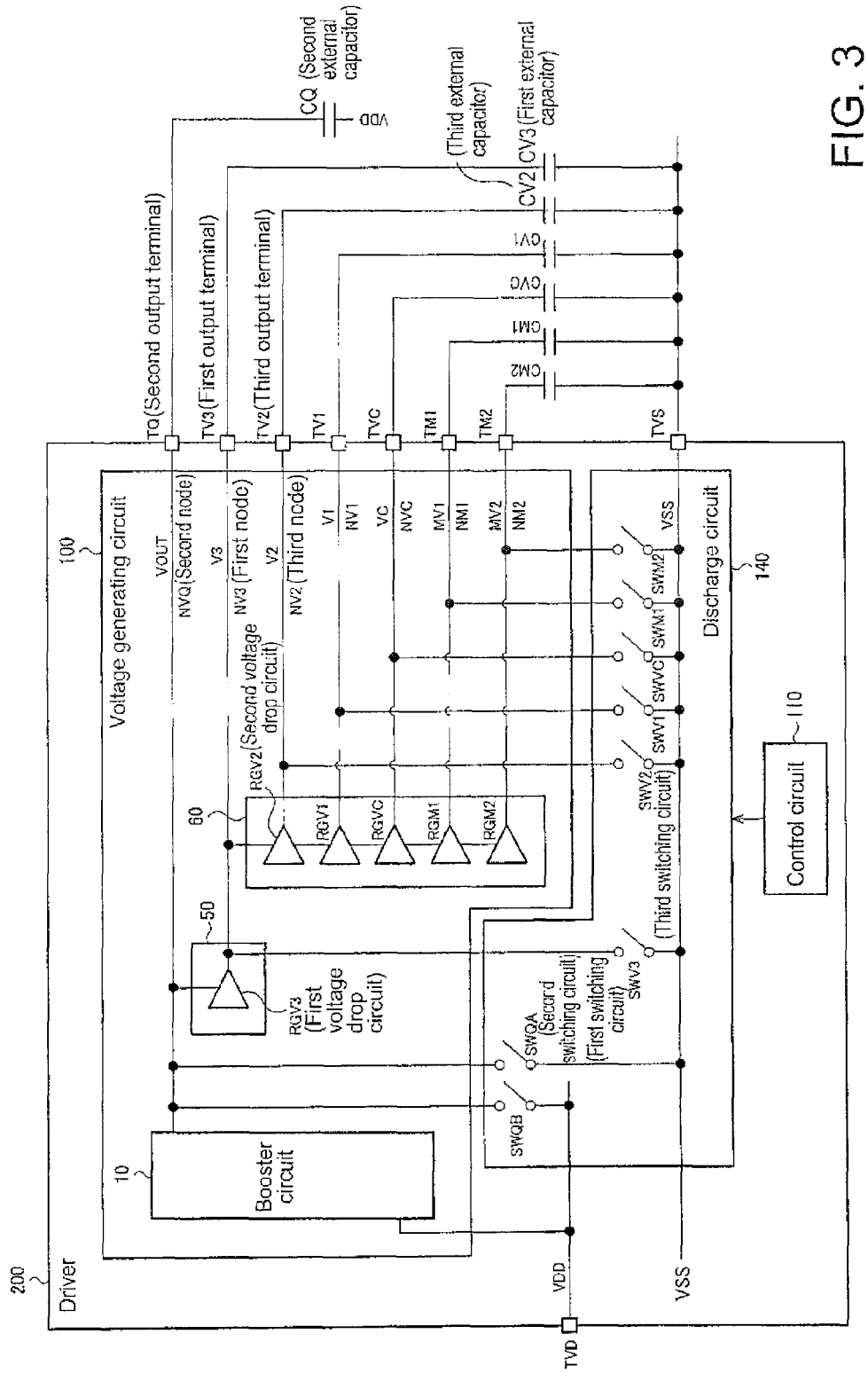
FIG. 3 shows an exemplary detailed configuration of the driver in the present embodiment.

FIG. 1 shows an exemplary configuration of a driver in the present embodiment. The driver includes a voltage generating circuit 100 and a discharge circuit 140. As shown in FIG. 3, for example, the driver further includes a control circuit 110.

The voltage generating circuit 100 is an internal power supply of the driver, and generates a first voltage VA1 and a second voltage VA2 for driving a display panel. The voltage generating circuit 100 then outputs the first voltage VA1 to a first node NA1, and outputs the second voltage VA2 to a second node NA2.

For example, the voltage VA1 and the node NA1 correspond to a voltage V3 and a node NV3 in FIG. 3, respectively, and the voltage V3 is a voltage for driving a common electrode of a liquid crystal display panel. For example, the voltage VA2 and the node NA2 correspond to a voltage VOUT and a node NVQ in FIG. 3, respectively, and the voltage VOUT is a voltage serving as a generation source of a series of driving voltages. Capacitors CV3 and CQ for stabilizing voltage are connected to the nodes NV3 and NVQ, respectively, and these capacitors CV3 and CQ hold charges corresponding to the respective voltages.

The discharge circuit 140 performs a discharge operation when the voltage generating circuit 100 is deactivated. Specifically, the discharge circuit 140 discharges the charges stored in the first node NA1 and the second node NA2 to a node of a ground line voltage VSS. Since the capacitors are connected to the nodes NA1 and NA2 as mentioned above, the charges held by these capacitors flow toward the ground line voltage VSS. The current at this time will be referred to as a "discharge current" below.

Here, "being deactivated" (non-operating state) refers to a state where the voltage generating circuit 100 stops generating voltage. Specifically, the voltage generating circuit 100 is deactivated by setting a voltage output node to a high impedance state, or turning off a bias current of the voltage generating circuit 100, for example. For example, the voltage generating circuit 100 is deactivated by stopping a switching operation of a later-described booster circuit 10 (e.g., charge pump circuit or switching regulator), or stopping a bias current of a first voltage drop circuit 20 (e.g., linear regulator).

Heretofore, the discharge circuit 140 simultaneously discharges the first node NA1 and the second node NA2. Therefore, a problem arises in that a large discharge current is generated and causes a rise in the ground line voltage VSS within the driver. Although the details will be described later using FIG. 5 etc., for example, a driver 200 is implemented on a glass substrate of an LCD module 300, and a terminal of the driver 200 is connected to a terminal of the LCD module by an interconnect of a transparent electrode. Since this transparent electrode has a high resistance value (e.g., parasitic resistance RMV of ground line is several dozen ohms (Ω)), if a large discharge current flows, the ground line voltage VSS significantly rises and affects the internal circuit of the driver 200.

In the present embodiment, the discharge circuit 140 performs a first discharge operation of discharging the first node NA1, and thereafter performs a second discharge operation of discharging the second node NA2.

Thus, generation timings of the discharge current from the first node NA1 and the discharge current from the second node NA2 are distributed, and accordingly the discharge current at each time becomes small. A rise in the ground line voltage VSS can thereby be suppressed, and accordingly the influence on the internal circuit can be reduced.

As another method for handling the discharge current, JP-A-2005-094574 discloses a method in which a ground line for a discharge is laid out separately from a ground line for an internal processing circuit to avoid the influence of the discharge current on the internal processing circuit.

However, this method separates the ground lines, resulting in an increase in a layout area, and is therefore not suitable for a reduction in the costs of the driver. For example, if JP-A-2005-094574 is applied to the LCD module 300 in FIG. 5, a ground line for causing a discharge current to flow will be provided separately from an interconnect of a ground line voltage MV3_IC for an analog circuit. Furthermore, a terminal of the driver 200 for this ground line, a terminal of the LCD module 300, and an interconnect of a transparent electrode for connecting these terminals are necessary, and layout areas of both the driver 200 and the LCD module 300 will increase.

In this regard, the ground lines are not separated in the present embodiment, and the influence of the discharge current can be avoided. That is to say, a discharge can be performed using the interconnect of the ground line voltage MV3_IC, and a new interconnect or terminal is not required. For this reason, the present embodiment is suitable for a cost reduction.

As shown in FIG. 1, the voltage generating circuit 100 can further output a third voltage VA3 to a third node NA3. Specifically, the voltage generating circuit 100 includes a booster circuit 10 that outputs the second voltage VA2, a first voltage drop circuit 20 that drops the second voltage VA2 to generate the first voltage VA1, and a second voltage drop circuit 30 that drops the first voltage VA1 to generate the third voltage VA3.

The discharge circuit performs the first discharge operation and the second discharge operation after performing a third discharge operation of discharging the third node NA3. Since the third voltage VA3 is less than the first voltage VA1, and the first voltage VA1 is less than the second voltage VA2 (VA3<VA1<VA2), the nodes are discharged in the ascending order of voltage.

Figure 2:
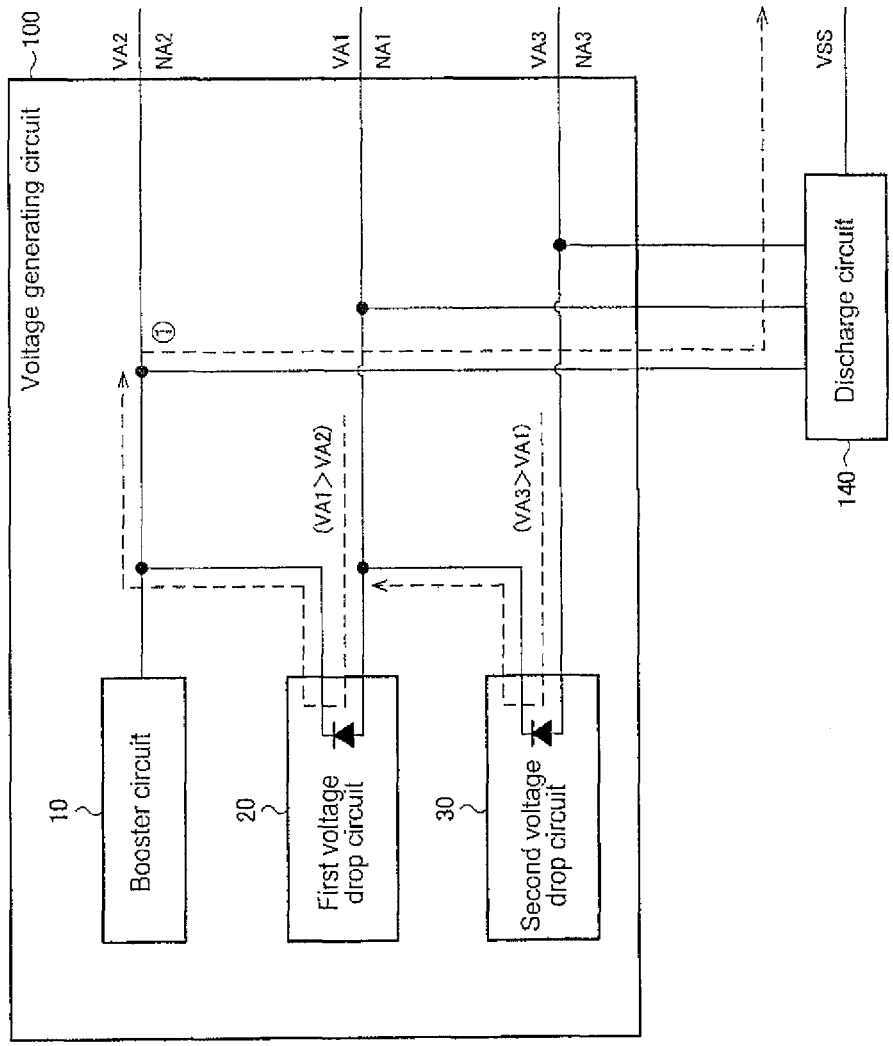
FIG. 2 is a diagram illustrating a comparative example of a discharge operation.

Here, consider the case of a comparative example in which the second node NA2 having the second voltage VA2, which is highest, is first discharged. FIG. 2 is a diagram illustrating the comparative example.

The first voltage drop circuit 20 is constituted by, for example, a linear regulator including a transistor, which connects the second node NA2 and the first node NA1 to each other by a PN junction (diode). For example, in the case of using a MOS transistor, a case can be assumed in which the voltage of a bulk (N) of a P-type transistor is set to the voltage VA2, and a drain (P) thereof is connected to the voltage VA1.

If the second node NA2 is first discharged, the voltage VA2 of the second node NA2 first drops, and accordingly becomes lower than the voltage VA1 of the first node NA1 (VA1>VA2). Then, the voltages cause the aforementioned PN junction to be forward-biased, and a current flows from the first node NA1 to the second node NA2. Since this current flows to the ground via the discharge circuit 140, the first node NA1 is substantially discharged as well. Upon the voltage VA1 dropping, the voltage VA3 of the third node NA3 becomes larger than the voltage VA1 (VA3>VA1), and accordingly the third node NA3 is similarly discharged via the second voltage drop circuit 30, the first voltage drop circuit 20, and the discharge circuit 140.

Thus, if the node NA2 having a high voltage VA2 is first discharged, the nodes NA1 and NA3 having lower voltages VA1 and VA3 are simultaneously discharged as well, and a shift of the discharge timings is meaningless.

In this regard, by discharging the nodes in the ascending order of voltage, i.e., discharging the third node NA3, the first node NA1, and the second node NA2 in this order as in the present embodiment, the voltages for causing to the aforementioned diode to be reverse-biased can be maintained. Generation timings of the discharge current are thereby actually distributed, and a rise in the ground line voltage VSS can be suppressed.

2. Detailed Configuration of Driver

The aforementioned driver is applicable to a display panel of a simple matrix method using STN (Super-Twisted Nematic) liquid crystal, for example. FIG. 3 shows an exemplary detailed configuration of the driver 200 in this case.

The driver 200 includes the voltage generating circuit 100, the discharge circuit 140, and the control circuit 110.

First, the details of the voltage generating circuit 100 will be described. The voltage generating circuit 100 includes the booster circuit 10 that boosts a system power supply voltage VDD to generate a voltage VOUT, a common voltage generating circuit 50 that generates a common voltage V3, and a segment voltage generating circuit 60 that generates segment voltages V2, V1, VC, MV1, and MV2.

The system power supply voltage VDD is a voltage supplied from the outside of the driver 200 to a terminal TVD, and is supplied from a power supply unit of a system (e.g., electronic device in FIG. 9) including the driver 200. The booster circuit 10 is constituted by a booster circuit of a charge pump type using a switched capacitor, or a switching regulator using an inductor, for example. The booster circuit 10 outputs a boosted voltage VOUT to the node NVQ. The node NVQ is connected to a terminal TQ (second output terminal), and an external capacitor CQ (second external capacitor) is connected to the terminal TQ.

The common voltage generating circuit 50 includes a regulator RGV3 that drops the voltage VOUT. The regulator RGV3 outputs a dropped voltage V3 to the node NV3. The node NV3 is connected to a terminal TV3 (first output terminal), and an external capacitor CV3 (first external capacitor) is connected to the terminal TV3.

The segment voltage generating circuit 60 includes regulators RGV2, RGV1, RGVC, RGM1, and RGM2 that drop the voltage V3. The regulators RGV2, RGV1, RGVC, RGM1, and RGM2 output dropped voltages V2, V1, VC, M1, and M2 to nodes NV2, NV1, NVC, NM1, and NM2, respectively. The node NV2 is connected to a terminal TV2 (third output terminal), and an external capacitor CV2 (third external capacitor) is connected to the terminal TV2. The nodes NV1, NVC, NM1, and NM2 are connected to the terminals TV1, TVC, TM1, and TM2, respectively, and the external capacitors CV1, CVC, CM1, and CM2 are connected to the terminals TV1, TVC, TM1, and TM2, respectively.

Seven voltage values, namely the above six voltages V3, V2, V1, VC, MV1, and MV2 plus the ground line voltage VSS are used for MLS (Multi Line Selection) driving of the liquid crystal display panel. The voltages V3, VC, and VSS are supplied to a common driver 190 in FIG. 8, and are used for driving common electrodes of a display panel 210. The voltages V2, V1, VC, MV1, and MV2 are supplied to a segment driver 150 in FIG. 8, and are used for driving segment electrodes of the display panel 210.

MLS driving is a driving method in which a plurality of common electrodes (scan lines) are simultaneously selected. For example, when driving a display panel having 64 scan lines by simultaneously selecting 4 scan lines, simultaneous selection of 4 scan lines is performed 64 times to write an image of one frame. The same voltage (difference between common voltage and segment voltage) is written in pixels of the simultaneously selected 4 scan lines while writing is performed once, and the writing is performed four times on one scan line. Therefore, by changing the voltage during the four times of writing, a transmittance corresponding to each pixel value is achieved as a whole. For this reason, the MLS driving requires multiple values of the common voltage and the segment voltage.

As described above, since the MLS driving of STN liquid crystals uses multiple values of voltage, a large number of external capacitors are necessary, and the discharge current becomes large. In the present embodiment, the generation timings of the discharge current can be distributed. Accordingly, even when using multiple values of voltage are used as in the MLS driving, a peak of the discharge current can be suppressed.

Next, the details of the discharge circuit 140 will be described. The discharge circuit 140 includes a switching element SWQA (second switching circuit) connected between the node NVQ and the node of the ground line voltage VSS, and a switching element SWQB connected between the node NVQ and a node of the system power supply voltage VDD. The discharge circuit 140 also includes a switching element SWV3 (first switching circuit) connected between the node NV3 and the node of the ground line voltage VSS. The discharge circuit 140 also includes a switching element SWV2 (third switching circuit) connected between the node NV2 and the node of the ground line voltage VSS, and switching elements SWV1, SWVC, SWM1, and SWM2 that are connected between the node of the ground line voltage VSS and the nodes NV1, NVC, NM1, and NM2, respectively.

The control circuit 110 controls switching on and off of these switching elements, thereby controlling the discharge operation. Specifically, when the system power is turned off, a processing unit (e.g., processing unit 310 in FIG. 9) of the system gives the control circuit 110 an instruction of a sequence of turning off the power. The sequence includes the turning off of a display operation, the turning off of the internal power supply (voltage generating circuit 100), the discharge operation, and hardware reset (reset of the IC of the driver 200) in this order. Lastly, the processing unit turns off the system power. If a discharge operation command is input from the processing unit, the control circuit 110 internally starts the sequence of the discharge operation.

3. Comparative Example, and LCD Module

As described using FIG. 1, a simultaneous discharge of all nodes affects the internal circuit of the driver 200. This point will now be described in detail, taking an LCD module of STN liquid crystals as an example.

Figure 4:
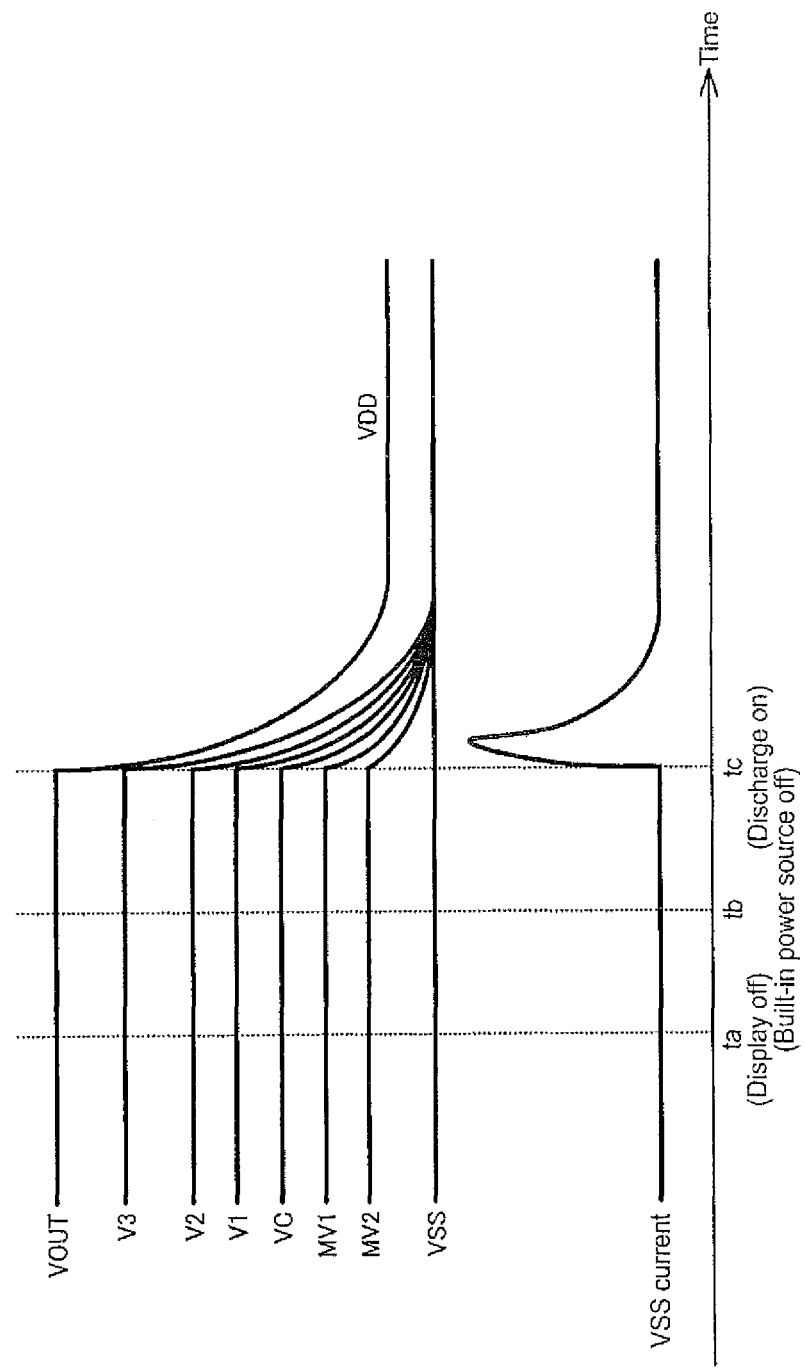
FIG. 4 is a timing chart in a comparative example of the discharge operation.

FIG. 4 is a timing chart of a discharge current in a comparative example. In this comparative example, upon the discharge operation being started, the voltage of each node in the discharge circuit 140 simultaneously lowers toward the ground line voltage VSS, and the discharge current flows into the node of the ground line voltage VSS at the same time. Therefore, the peak value of the discharge current becomes very large.

Figure 5:
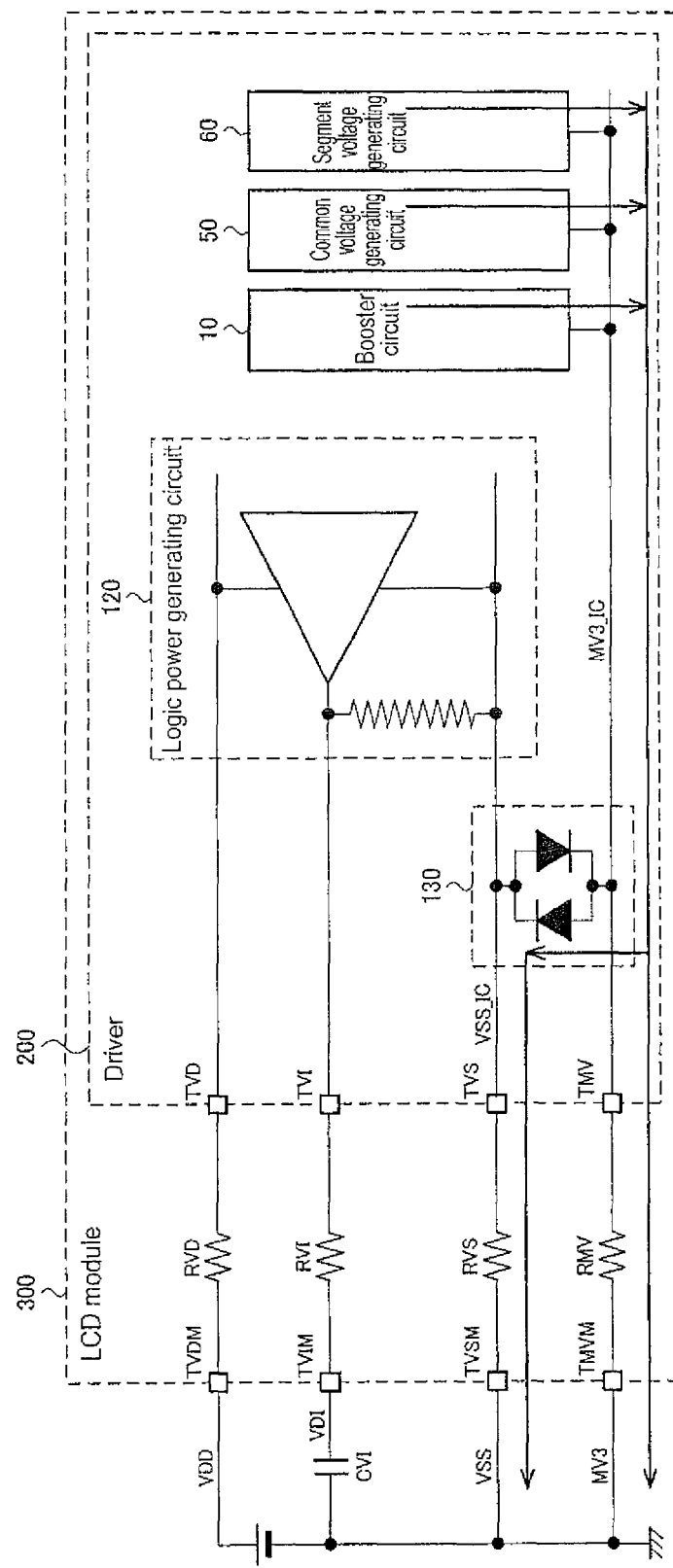
FIG. 5 shows an exemplary configuration of an LCD module.

FIG. 5 shows an exemplary configuration of the LCD module 300 (electro-optical device) on which the driver 200 is implemented. The LCD module 300 includes a glass substrate (not shown), and an STN liquid crystal pixel array is formed on this glass substrate. The electrode of the pixel array is formed by a transparent electrode (transparent conductive film, indium tin oxide (ITO)), and this transparent electrode is extended onto the glass substrate and is connected as interconnects of the common and segment electrodes to the driver 200. Similarly, the interconnect for the power supply is also formed by the transparent electrode on the glass substrate.

Specifically, the driver 200 is implemented as an integrated circuit device (IC) on the glass substrate. A system power supply terminal TVD, a logic power supply terminal TVI, a logic ground terminal TVS, and an analog ground terminal TMV of the driver 200 are connected to LCD module terminals TVDM, TVIM, TVSM, and TMVM, respectively, by the interconnect of the transparent electrode. The driver 200 does not include a metal interconnect, and is wired using only the transparent electrode. These interconnect resistances are denoted respectively by RVD, RVI, RVS, and RMV in FIG. 5.

A resistance value of a transparent electrode is several kΩ in the interconnect for the segment electrodes, for example, and is very high. Even if an interconnect is thickly formed for the power supply, the interconnect resistance thereof is about 30Ω, for example. Although the resistance can be lowered using a metal interconnect, it is favorable to use a transparent electrode, in terms of costs of the module. Furthermore, the thickness of the interconnect of the transparent electrode is limited in terms of the costs as well, and therefore, the interconnect resistance of the power supply is left in any case.

Assume that the discharge current in the case of simultaneously discharging the output nodes of the booster circuit 10, the common voltage generating circuit 50, and the segment voltage generating circuit 60 is 30 mA, for example. Since the resistance RMV of the ground line is about 30Ω, the ground line voltage MV3_IC within the driver 200 rises by about 0.9 V.

Figure 6:
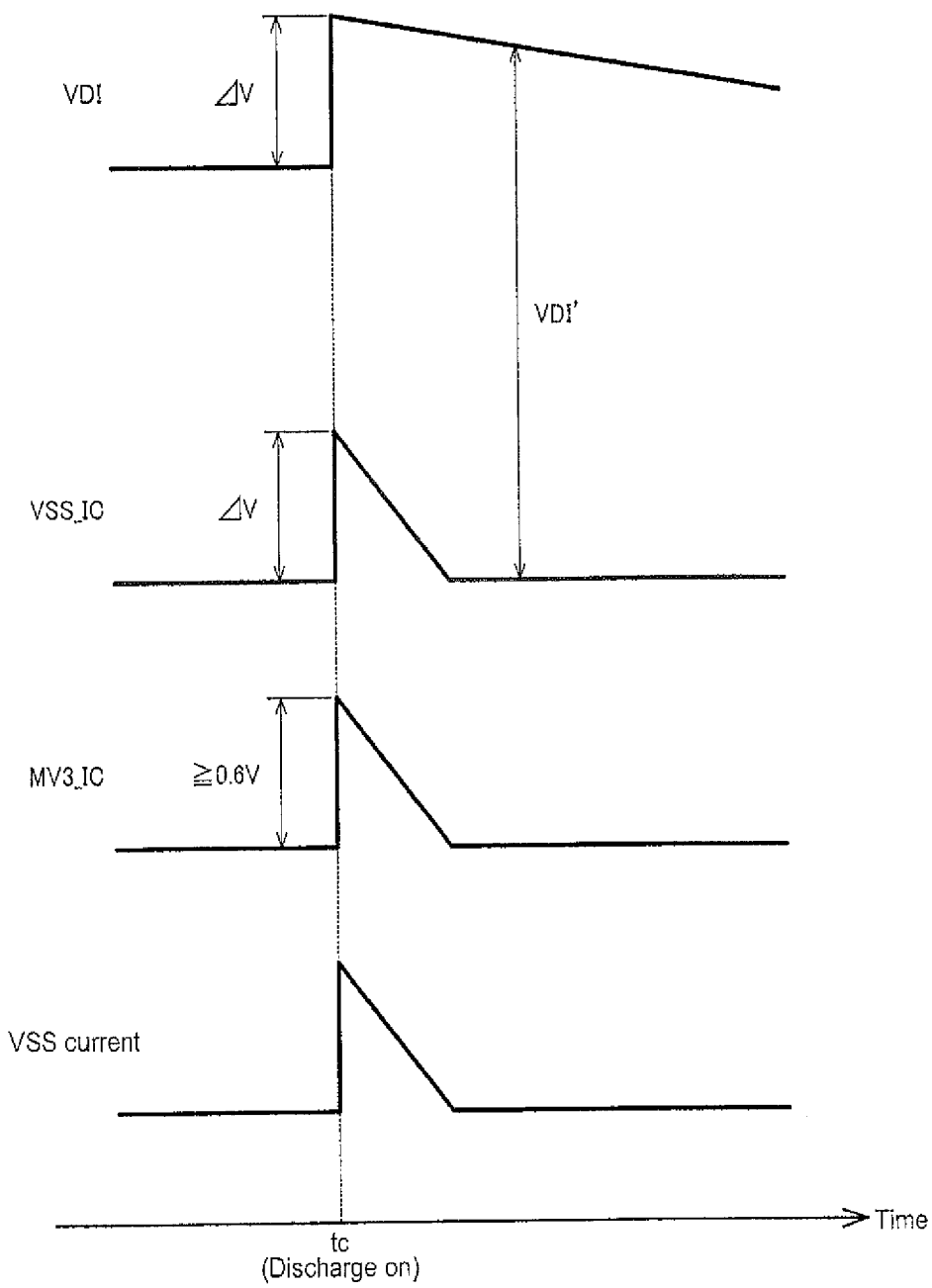
FIG. 6 is a diagram illustrating a voltage variation accompanying a discharge.

FIG. 6 is a diagram illustrating a voltage variation accompanying a discharge. As mentioned above, the ground line voltage MV3_IC within the driver 200 rises up to 0.9 V after the discharge operation is started. The analog ground line voltage MV3_IC and the logic ground line voltage VSS_IC are separated from each other in order to prevent noise, for example, but are connected to each other by an electrostatic protection circuit 130. If the analog ground line voltage MV3_IC exceeds 0.6 V, a voltage that forward-biases a diode of the electrostatic protection circuit 130 is applied, and therefore (a part of) the discharge current flows into the logic ground line voltage VSS_IC.

The resistance RVS of the logic ground line is similarly 30Ω. Assuming that all discharge current flows to the logic ground line voltage VSS_IC, the logic ground line voltage VSS_IC within the driver 200 rises by ΔV=0.9 V. The driver 200 generates the power supply for the logic circuit such as the control circuit 110, using an internal logic power generating circuit 120. The logic power generating circuit 120 generates a logic power supply voltage VDI with the logic ground line voltage VSS_IC as a reference, and accordingly, if the logic ground line voltage VSS_IC rises by ΔV=0.9 V, the logic power supply voltage VDI similarly rises by ΔV=0.9 V This logic power supply voltage VDI is charged to a stabilizing capacitor CVI. A sink current of the logic power generating circuit 120 is very small for the purpose of reducing current consumption, and accordingly the voltage that is temporarily charged to the capacitor CVI does not immediately lower. On the other hand, the logic ground line voltage VSS_IC immediately lowers upon the discharge current becoming small, and therefore, a difference VDI' between the logic power supply voltage VDT and the logic ground line voltage VSS_IC increases up to ΔV=0.9 V at the maximum. For example, if the usual logic power supply voltage VDI is 2.5V, the difference VDI' increases up to 3.4V at the maximum.

In general, the breakdown voltage of a transistor constituting a logic circuit is low, and if the maximum rating of the breakdown voltage is about 3 V, for example, 3.4 V is larger than the maximum rating. Even if the transistor is not broken, a voltage close to the breakdown voltage is repeatedly applied every time the power is turned off, and therefore, the logic circuit may possibly be permanently broken while being used for a long time period.

As described above, the LCD module using STN liquid crystals has a problem in that the long-term reliability of the driver IC decreases due to the discharge current.

4. Details of Discharge Operation

Figure 7:
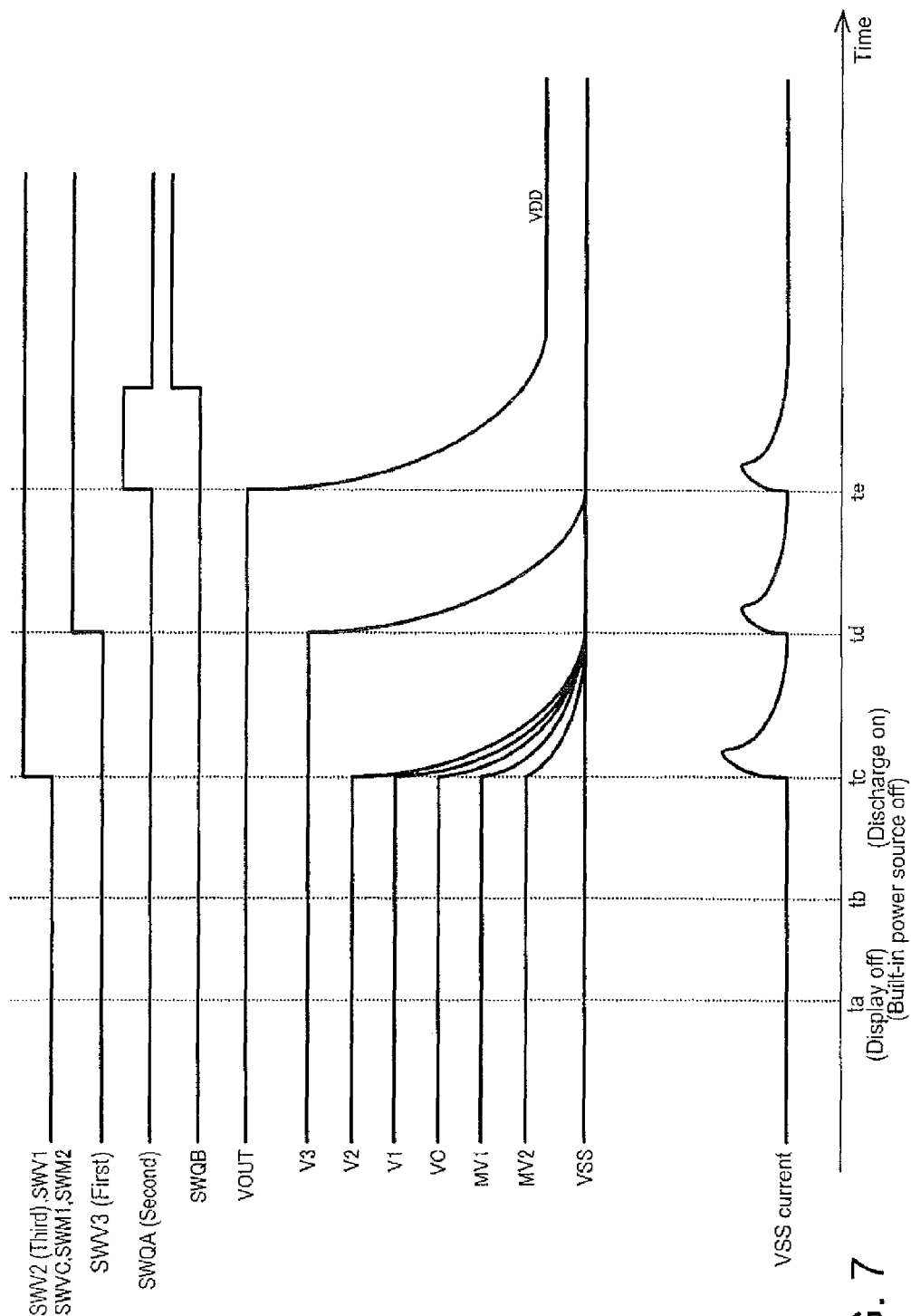
FIG. 7 is a timing chart of the discharge operation in the present embodiment.

FIG. 7 is a timing chart of the discharge operation in the present embodiment. Upon the discharge operation being started, the control circuit 110 turns on the switching elements SWV2, SWV1, SWVC, SWM1, and SWM2 that correspond to the segment voltage, at a timing tc. Next, the control circuit 110 turns on the switching element SWV3 corresponding to the common voltage at a timing td (tc<td), and then turns on the switching element SWQA corresponding to the output voltage VOUT of the booster circuit 10 at a timing te (td<te).

The timings tc, td, and te are determined by considering the capacitance of the external capacitors, resistance values of discharges paths; and the like. For example, a configuration may be employed in which a register (not shown) is provided so as to be able to change the timings using a resistor value thereof.

Upon turning on the switching elements in the above order, a discharge is performed in the ascending order of voltage, since the segment voltages V2, V1, VC, MV1 and MV2 are each less than the common voltage V3, and the common voltage V3 is less than the voltage VOUT (V2<V3, V1<V3, VC<V3, MV1<V3, and MV2<V3; and V3<VOUT). By performing the discharge in the ascending order of voltage as described above using FIG. 2, it is possible to avoid substantially simultaneous flows of the discharge current, distribute the generation timings of the discharge current, and decrease the current peak value. As a result, the logic power supply voltage VDI will not exceed the maximum rating of the breakdown voltage, and the long-term reliability of the driver IC can be ensured. In particular, in the field of semiconductor devices, which have been more and more miniaturized, there is a tendency for the logic power supply voltage VDI to lower (i.e., for the breakdown voltage to decrease), and the present embodiment is highly effective.

Note that the output voltage VOUT of the booster circuit 10 drops toward the ground line voltage VSS by the switching element SWQA first turning on, but thereafter the switching element SWQA turns off and the switching element SWQB turns on. This switching is performed when the voltage VOUT becomes close to the system power supply voltage VDD, and the output voltage VOUT ultimately converges to the system power supply voltage VDD. For example, the switching may be performed by the control circuit 110, or the switching may be performed by an analog circuit (not shown) detecting a drop of the voltage VOUT.

This switching is performed for the following reason, for example. That is to say, when a PN junction is included in the transistor within the booster circuit 10, and the system power supply voltage VDD and the output voltage VOUT are connected to the PN junction, the PN junction is forward-biased if VDD becomes larger than VOUT. In order to avoid this, the voltage VOUT is caused to converge to the system power supply voltage VDD. If the discharge is performed with respect to the system power supply voltage VDD from the beginning, the discharge speed depends on the capability of the system power supply, and moreover, a rise in the system power supply voltage VDD adversely affects circuits in the system. For this reason, the discharge is performed at first with respect to the ground line voltage VSS.

5. Electro-Optical Device

Figure 8:
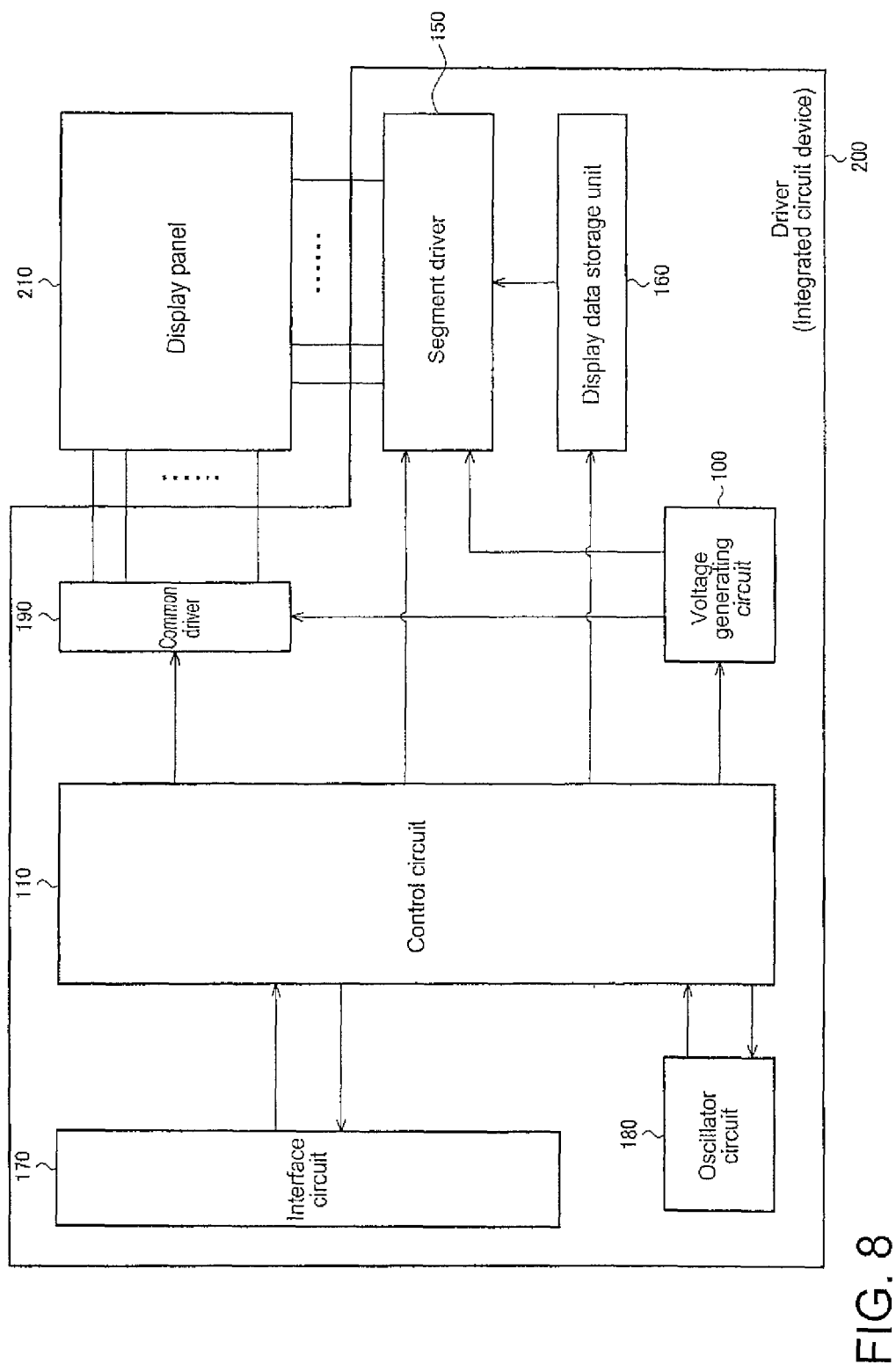
FIG. 8 shows an exemplary configuration of an electro-optical device.

FIG. 8 is an exemplary configuration of an electro-optical device (display device) to which the driver 200 in the present embodiment is applicable. The electro-optical device includes the driver 200 and the display panel 210.

The following description will take, as an example, the case where the electro-optical device is an LCD module using STN liquid crystals. Note that the invention is not limited thereto, and the driver 200 in the present embodiment is applicable to any electro-optical device that requires a discharge of a power supply.

The driver 200 includes the voltage generating circuit 100, the control circuit 110, the segment driver 150, a display data storage unit 160, an interface circuit 170, an oscillator circuit 180, and a common driver 190. The driver 200 is configured as an integrated circuit device, for example.

The control circuit 110 operates based on a clock signal supplied from the oscillator circuit 180. The control circuit 110 receives the input of display data and a synchronizing signal from a host controller (e.g., processing unit 310 in FIG. 9) via the interface circuit 170, and the control circuit 110 causes the display data storage unit 160 to store the display data. The display data storage unit 160 is constituted by a RAM, for example. The voltage generating circuit 100 supplies a driving voltage to the common driver 190 and the segment driver 150. The common driver 190 drives common electrodes (scan lines) of the display panel 210 based on an instruction from the control circuit 110. The segment driver 150 has an MLS decoder (not shown). The MLS decoder decodes the display data stored in the display data storage unit 160 into MLS driving data. The segment driver 150 selects a segment voltage corresponding to the decoded data, and drives segment electrodes (data lines) of the display panel 210.

Momentary lighting at the time of tuning off the power occurs in the following manner. That is to say, if the system power is turned off and the power supply to the driver 200 stops, the control circuit 110 cannot control the common driver 190 and the segment driver 150, and accordingly the output of these drivers becomes unsteady. At this time, if a driving voltage held by a stabilizing capacitor is supplied to the common driver 190 and the segment driver 150, since the common electrodes and the segment electrodes in the STN liquid crystals are directly connected to pixels, the driving voltage may possibly be applied to the pixels, which may cause momentary lighting.

In this regard, according to the present embodiment, the voltage generating circuit is deactivated after drive circuits (common driver 190, segment driver 150) end the driving of the display panel, and the discharge circuit 140 performs the discharge operation. With this operation, after image display is turned off, a discharge is performed before the system power is turned off, and the aforementioned momentary lighting can be avoided. Furthermore, the driver 200 in the present embodiment can distribute the discharge current, and accordingly the influence thereof on the internal circuit of the driver 200 can be reduced.

6. Electronic Device

Figure 9:
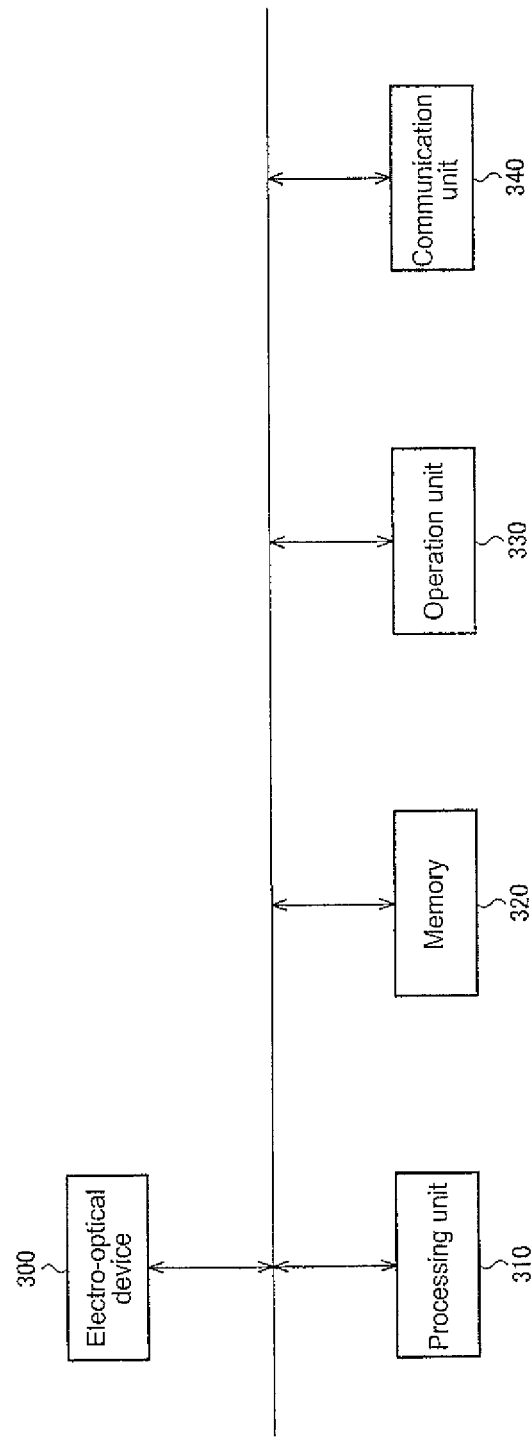
FIG. 9 shows an exemplary configuration of an electronic device.

FIG. 9 shows an exemplary configuration of an electronic device to which the driver 200 in the present embodiment is applicable. The electronic device includes the electro-optical device 300 (which includes the driver 200 and the display panel 210), a processing unit 310, a memory 320, an operation unit 330, and a communication unit 340.

As the electronic device, for example, a meter display device of an automobile, a copy machine, a facsimile, or a fixed telephone having a display unit, a clock or a watch having a display unit, or the like is assumed.

The processing unit 310 is constituted by a processor such as a CPU, or an ASIC or a DSP for image processing, and performs various kinds of processing and control of each part. For example, the processing unit 310 performs processing for reading out image data from the memory 320, or receiving image data via the communication unit 340, and causing the electro-optical device 300 to display this image data. The memory 320 is constituted by a RAM, a ROM, or the like, and functions as a working memory of the processing unit 310 or stores various kinds of data. The operation unit 330 is constituted by a touch panel, buttons, and the like, for example, and accepts operation information from a user. The communication unit 340 is an interface such as a USB, a wired LAN, optical communication, a wireless LAN, or mobile communication (e.g., 3G or 4G), and transmits and receives various kinds of data and control information to/from an external device.

Note that, although the present embodiment has been described above in detail, those skilled in the art will readily understand that the embodiment can be modified in various manners without substantially departing from the new matter and the effect of the invention. Accordingly, all these modifications are to be encompassed in the scope of the invention. For example, a term that is recited at least once in the specification or the drawings together with a different term having a wider meaning or the same meaning may be replaced with this different term in any part of the specification or the drawings. All combinations of the present embodiment and the modifications are encompassed in the scope of the invention. The configurations, operations, and the like of the voltage generating circuit, the discharge circuit, the driver, the electro-optical device, the electronic device, and the like are not limited to those described in the embodiment, and may be modified in various manners.

What is claimed is:

1. A driver comprising:
   a voltage generating circuit that generates a first voltage and a second voltage for driving a display panel, outputs the first voltage to a first node, and outputs the second voltage to a second node; and
   a discharge circuit that performs a discharge operation if the voltage generating circuit is deactivated,
   the discharge circuit performing a first discharge operation of discharging the first node, and thereafter performing a second discharge operation of discharging the second node, and
   the order of discharge being based on values of the first voltage and the second voltage, such that the first node and the second node are discharged in ascending order of the values of the first voltage and the second voltage.

2. The driver according to claim 1,
   wherein the voltage generating circuit comprises a first voltage drop circuit that drops the second voltage to generate the first voltage.

3. The driver according to claim 2,
   wherein the voltage generating circuit comprises a booster circuit that boosts a system power supply voltage to generate the second voltage, and
   the first voltage drop circuit generates a common voltage of the display panel as the first voltage obtained by dropping the second voltage.

4. The driver according to claim 2,
   wherein the voltage generating circuit comprises a second voltage drop circuit that drops the first voltage to generate a third voltage, and outputs the third voltage to a third node, and
   the discharge circuit performs a third discharge operation of discharging the third node, and thereafter performs the first discharge operation.

5. The driver according to claim 4,
   wherein the second voltage drop circuit generates a segment voltage of the display panel as the third voltage.

6. The driver according to claim 4, further comprising:
   a control circuit that controls the discharge circuit,
   wherein the discharge circuit comprises first to third switching circuits that are provided between a node of a ground line voltage and the first to third nodes, respectively, and
   by the control circuit turning on the third switching circuit, the first switching circuit, and the second switching circuit in this order, the discharge circuit performs the third discharge operation, the first discharge operation, and the second discharge operation in this order.

7. The driver according to claim 4, further comprising:
   first to third output terminals for connecting first to third external capacitors,
   wherein the first to third nodes are connected to the first to third output terminals.

8. The driver according to claim 1, further comprising:
   a drive circuit that drives the display panel based on at least the first voltage among the first voltage and the second voltage,
   wherein, after the drive circuit ends the driving of the display panel, the voltage generating circuit is deactivated, and the discharge circuit performs the discharge operation.

9. An electro-optical device comprising:
   the driver according to claim 1; and
   the display panel.

10. The electro-optical device according to claim 9,
wherein a ground terminal of the electro-optical device and a ground terminal of the driver are connected to each other by an interconnect of a transparent electrode of the display panel.

11. An electronic device comprising: the driver according to claim 1.

12. The driver according to claim 1,
wherein the discharge circuit performs the first discharge operation by discharging charges stored in the first node to a ground line voltage, and thereafter performs the second discharge operation by discharging charges stored in the second node to the ground line voltage.

13. A driver comprising:
a voltage generating circuit that generates a first voltage and a second voltage for driving a display panel, outputs the first voltage to a first node, and outputs the second voltage to a second node;
a drive circuit that drives the display panel based on at least one of the first voltage and the second voltage; and
a discharge circuit that, after the drive circuit ends driving the display panel and the voltage generating circuit is deactivated, discharges the first node, and then discharges the second node, and
the order of discharge being based on values of the first voltage and the second voltage, such that the first node and the second node are discharged in ascending order of the values of the first voltage and the second voltage.

14. The driver according to claim 13,
wherein the voltage generating circuit comprises a first voltage drop circuit that drops the second voltage to generate the first voltage.

15. The driver according to claim 14, wherein
the voltage generating circuit comprises a booster circuit that boosts a system power supply voltage to generate the second voltage, and
the first voltage drop circuit generates a common voltage of the display panel as the first voltage obtained by dropping the second voltage.

16. The driver according to claim 14, wherein
the voltage generating circuit comprises a second voltage drop circuit that drops the first voltage to generate a third voltage, and outputs the third voltage to a third node, and
the discharge circuit discharges the third node, and then discharges the first node.

17. The driver according to claim 16,
wherein the second voltage drop circuit generates a segment voltage of the display panel as the third voltage.

18. The driver according to claim 16, further comprising:
a control circuit that controls the discharge circuit,
wherein the discharge circuit comprises first to third switching circuits that are provided between a node of a ground line voltage and each of the first, second and third nodes, respectively, and
by the control circuit turning on the third switching circuit, the first switching circuit, and the second switching circuit in this order, the discharge circuit discharges the third node, the first node, and the second node in this order.

19. The driver according to claim 16, further comprising:
first, second and third output terminals for connecting first, second and third external capacitors,
wherein the first, second and third nodes are connected to the first, second and third output terminals.

* * * * *